United States Patent
Leppänen et al.

(10) Patent No.: US 9,892,758 B2
(45) Date of Patent: Feb. 13, 2018

(54) AUDIO INFORMATION PROCESSING

(71) Applicant: Nokia Technologies Oy, Espoo (FI)

(72) Inventors: Jussi Leppänen, Tampere (FI); Arto Juhani Lehtiniemi, Lempäälä (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/104,671

(22) PCT Filed: Dec. 20, 2013

(86) PCT No.: PCT/IB2013/061183
§ 371 (c)(1),
(2) Date: Jun. 15, 2016

(87) PCT Pub. No.: WO2015/092492
PCT Pub. Date: Jun. 25, 2015

(65) Prior Publication Data
US 2017/0047094 A1    Feb. 16, 2017

(51) Int. Cl.
*G11B 27/036* (2006.01)
*G11B 27/031* (2006.01)
(Continued)

(52) U.S. Cl.
CPC ......... *G11B 27/036* (2013.01); *G10H 1/0025* (2013.01); *G11B 27/031* (2013.01); *G11B 27/10* (2013.01); *G10H 2210/105* (2013.01)

(58) Field of Classification Search
CPC ..... G11B 27/036; G11B 27/031; G11B 27/10; G10H 1/0025
See application file for complete search history.

(56) References Cited

U.S. PATENT DOCUMENTS 8,205,148 B1 *  6/2012  Sharpe ................ G11B 27/034
                                                         715/203
9,078,091 B2   7/2015  Lehtiniemi et al.
(Continued)

FOREIGN PATENT DOCUMENTS

EP       0674315        9/1995
WO    2012/001216 A1    1/2012
(Continued)

OTHER PUBLICATIONS

International Search Report and Written Opinion received for corresponding Patent Cooperation Treaty Application No. PCT/IB2013/061183, dated Oct. 17, 2014, 16 pages.
(Continued)

*Primary Examiner* — Mishawn Hunter
(74) *Attorney, Agent, or Firm* — Nokia Technologies Oy

(57) ABSTRACT

A method comprising: storing a continuous audio composition having plural tracks at least partially overlapping with one another in the temporal domain and having a specific alignment in the temporal domain; obtaining time-varying audio characteristics of an audio recording; identifying at least part of one of the plural tracks that corresponds to the audio recording; using the time-varying audio characteristics of the audio recording to align the audio recording with said at least part of the identified track; and substituting said at least part of the identified track with the audio recording with substantially the same alignment in the temporal domain as said at least part of the identified track.

21 Claims, 7 Drawing Sheets

(51) Int. Cl.
G11B 27/10 (2006.01)
G10H 1/00 (2006.01)

(56) References Cited

U.S. PATENT DOCUMENTS

| | | | |
|---|---|---|---|
| 9,135,927 | B2 | 9/2015 | Lehtiniemi et al. |
| 9,280,961 | B2 | 3/2016 | Eronen et al. |
| 2005/0042591 | A1* | 2/2005 | Bloom .................. G11B 27/034 434/307 A |
| 2007/0189710 | A1 | 8/2007 | Pedlow, Jr. |
| 2011/0113335 | A1 | 5/2011 | Rouse et al. |
| 2013/0263049 | A1 | 10/2013 | Lehtiniemi et al. |
| 2014/0121794 | A1 | 5/2014 | Eronen et al. |
| 2014/0135962 | A1* | 5/2014 | King ...................... G11B 27/10 700/94 |

FOREIGN PATENT DOCUMENTS

| | | |
|---|---|---|
| WO | 2013/064860 A1 | 5/2013 |
| WO | 2014/041399 A1 | 3/2014 |

OTHER PUBLICATIONS

Serra, J. et al.: "Chroma binary similarity and local alignment applied to cover song identification", IEEE Trans. on Audio, Speech and Language Processing, vol. 16, No. 6, Aug. 2008, pp. 1138-1151.
Eronen, A. et al.: "Musical instrument recognition using cepstral coefficients and temporal features", Int. Conf. on Acoustics, Speech, and Signal Processing (ICASSP2000), Istanbul, Turkey, Jun. 5-9, 2000, pp. 753-756, vol. 2.
Cricri et al., "Multimodal Event Detection in User Generated Videos", IEEE International Symposium on Multimedia, Dec. 5-7, 2011, pp. 263-270.
"Collaborate With Musicians Across the World or Across the Street", Kompoz, Retrieved on Jul. 12, 2016, Webpage available at : http://www.kompoz.com/music/home.
Eronen, "Automatic Musical Instrument Recognition", Thesis, Oct. 2001, 74 pages.
Ogale, "A Survey of Techniques for Human Detection From Video", Thesis, 2006, 15 pages.
Aggarwal et al., "Human Motion Analysis: A Review", IEEE proceedings of Nonrigid and Articulated Motion Workshop, Jun. 16, 1997, pp. 90-102.
Helen et al., "Separation of Drums From Polyphonic Music Using Non-negative Matrix Factorization and Support Vector Machine", In Proceedings of the European Signal Processing conference, Sep. 4-5, 2005, pp. 1-4.
Klapuri, "Multiple Fundamental Frequency Estimation by Summing Harmonic Amplitudes", 7th International Conference on Music Information Retrieval, Oct. 8-12, 2006, 06 pages.
"Download it, sing it", karaoke-version, Retrieved on Jul. 12, 2016, Webpage available at : http://www.karaoke-version.com/.
Kitamura et al., "Music Signal Separation by Supervised Nonnegative Matrix Factorization with Basis Deformation", 18th International Conference on Digital Signal Processing, Jul. 1-3, 2013, 6 pages.
Nichols et al., "Automatically Discovering Talented musicians With Acoustic Analysis of Youtube Videos", IEEE International Conference on Data Mining, Dec. 10-13, 2012, pp. 559-565.
Klapuri et al., "Analysis of the Meter of Acoustic Musical Signals", IEEE Transactions on Audio, Speech, and Language Processing, vol. 14, No. 1, Jan. 2006, pp. 342-355.
Maddage et al., "A SVM-based Classification approach to Musical Audio", In Proceedings of the 4th International Conference on Music Information Retrieval, 2003, 02 pages.

\* cited by examiner

AUDIO INFORMATION PROCESSING

RELATED APPLICATION

This application was originally filed as PCT Application No. PCT/IB2013/061183 filed Dec. 20, 2013.

FIELD OF THE INVENTION

This invention relates to audio information processing, in particular substituting part of some audio information with other audio information.

BACKGROUND OF THE INVENTION

It is known for musicians to collaborate with one another to produce a cover version of some music e.g. a folk song. The result of such is called a collaboration cover.

SUMMARY OF THE INVENTION

Various aspects of examples of the invention are set out in the claims.

A first aspect of the invention provides a method comprising:
  storing a continuous audio composition having plural tracks at least partially overlapping with one another in the temporal domain and having a specific alignment in the temporal domain;
  obtaining time-varying audio characteristics of an audio recording;
  identifying at least part of one of the plural tracks that corresponds to the audio recording;
  using the time-varying audio characteristics of the audio recording to align the audio recording with said at least part of the identified track; and
  substituting said at least part of the identified track with the audio recording with substantially the same alignment in the temporal domain as said at least part of the identified track.

The method may further comprise: for plural different temporal alignments between the audio recording and the identified track, determining a degree of correlation between the time-varying audio characteristics of the audio recording and corresponding time-varying audio characteristics of the identified track; identifying a temporal alignment that provides a highest correlation; and substituting said at least part of the identified track with the audio recording using the identified temporal alignment.

The time-varying audio characteristics may comprise mel-frequency cepstral coefficient information, and/or chroma information, of respective frames wherein each frame has a length in the temporal domain.

The method may further comprise using the time varying audio characteristics of the audio recording to identify the one of the plural tracks that corresponds to the audio recording.

The method may further comprise: using the time varying audio characteristics of the audio recording to determine a type or class of instrument used to produce the audio recording; and identifying said one of the plural tracks, corresponding to the audio recording, by determining which track was produced using the same type or class of instrument.

The method may further comprise substituting said at least part of the identified track with the audio recording, with substantially the same alignment in the temporal domain as said at least part of the identified track, only if a measure of correspondence between the identified track and the audio recording exceeds a quality threshold.

The method may further comprise: determining a quality value indicative of the degree of correspondence between said at least part of the identified track and the audio recording; and refraining from substituting said at least part of the identified track with the audio recording if the quality value is less than a predetermined amount.

The method may further comprise: substantially aligning the substituted audio recording and a video associated therewith in the temporal domain.

The video associated with the substituted audio recording may be a video recording of a person creating said audio recording.

The method may further comprise: obtaining the audio recording and the video from a library if information associated with the video, also in the library, satisfies a predetermined condition.

Said information may be indicative of the number of times the video has been selected from the library, how often the video is selected from the library, or a user rating of the video.

The method may further comprise: obtaining the audio recording from a library if information associated therewith, also in the library, satisfies a predetermined condition.

Said information may be indicative of the number of times the audio recording has been selected from the library, how often the audio recording is selected from the library, or a user rating of the audio recording.

Substituting said at least part of the identified track with the audio recording with substantially the same alignment in the temporal domain as said at least part of the identified track may comprise: replacing said at least part of the identified track with the audio recording; or substantially silencing said at least part of the identified track and including a new track in the continuous audio composition, said new track containing the audio recording substantially in the same alignment in the temporal domain as said at least part of the identified track.

The method may further comprise: using time varying audio characteristics of another audio recording to identify at least part of one of the plural tracks that corresponds to the other audio recording; if said previously identified at least part of the identified track is identified to be the at least part of the one of the plural tracks that corresponds to said other audio recording, then determining another quality value indicative of the degree of correspondence between said at least part of the identified track and the other audio recording; and substituting said at least part of the identified track with the audio recording associated with the highest quality value, provided it is not less than said predetermined amount.

A second aspect of the invention provides a computer program comprising computer executable instructions, which, when executed by computing apparatus, causes the computing apparatus to perform a method comprising:
  storing a continuous audio composition having plural tracks at least partially overlapping with one another in the temporal domain and having a specific alignment in the temporal domain;
  obtaining time-varying audio characteristics of an audio recording;
  identifying at least part of one of the plural tracks that corresponds to the audio recording;

using the time-varying audio characteristics of the audio recording to align the audio recording with said at least part of the identified track; and substituting said at least part of the identified track with the audio recording with substantially the same alignment in the temporal domain as said at least part of the identified track.

The computer executable instructions when executed may further cause a computing apparatus to: for plural different temporal alignments between the audio recording and the identified track, determine a degree of correlation between the time-varying audio characteristics of the audio recording and corresponding time-varying audio characteristics of the identified track; identify a temporal alignment that provides a highest correlation; and substitute said at least part of the identified track with the audio recording using the identified temporal alignment.

The time-varying audio characteristics may comprise mel-frequency cepstral coefficient information, and/or chroma information, of respective frames wherein each frame has a length in the temporal domain.

The computer executable instructions when executed may further cause a computing apparatus to: use the time varying audio characteristics of the audio recording to identify the one of the plural tracks that corresponds to the audio recording.

The computer executable instructions when executed may further cause a computing apparatus to: use the time varying audio characteristics of the audio recording to determine a type or class of instrument used to produce the audio recording; and identify said one of the plural tracks, corresponding to the audio recording, by determining which track was produced using the same type or class of instrument.

The computer executable instructions when executed may further cause a computing apparatus to: substite said at least part of the identified track with the audio recording, with substantially the same alignment in the temporal domain as said at least part of the identified track, only if a measure of correspondence between the identified track and the audio recording exceeds a quality threshold.

The computer executable instructions when executed may further cause a computing apparatus to: determine a quality value indicative of the degree of correspondence between said at least part of the identified track and the audio recording; and refrain from substituting said at least part of the identified track with the audio recording if the quality value is less than a predetermined amount.

The computer executable instructions when executed may further cause a computing apparatus to: substantially align the substituted audio recording and a video associated therewith in the temporal domain.

The video associated with the substituted audio recording may be a video recording of a person creating said audio recording.

The computer executable instructions when executed may further cause a computing apparatus to: obtain the audio recording and the video from a library if information associated with the video, also in the library, satisfies a predetermined condition.

Said information may be indicative of the number of times the video has been selected from the library, how often the video is selected from the library, or a user rating of the video.

The computer executable instructions when executed may further cause a computing apparatus to: obtain the audio recording from a library if information associated therewith, also in the library, satisfies a predetermined condition.

Said information may be indicative of the number of times the audio recording has been selected from the library, how often the audio recording is selected from the library, or a user rating of the audio recording.

Substituting said at least part of the identified track with the audio recording with substantially the same alignment in the temporal domain as said at least part of the identified track may comprise: replacing said at least part of the identified track with the audio recording; or substantially silencing said at least part of the identified track and including a new track in the continuous audio composition, said new track containing the audio recording substantially in the same alignment in the temporal domain as said at least part of the identified track.

The computer executable instructions when executed may further cause a computing apparatus to: use time varying audio characteristics of another audio recording to identify at least part of one of the plural tracks that corresponds to the other audio recording; if said previously identified at least part of the identified track is identified to be the at least part of the one of the plural tracks that corresponds to said other audio recording, then determining another quality value indicative of the degree of correspondence between said at least part of the identified track and the other audio recording; and substituting said at least part of the identified track with the audio recording associated with the highest quality value, provided it is not less than said predetermined amount.

A third aspect of the invention provides a non-transitory computer readable storage medium having stored thereon computer-readable code, which, when executed by computing apparatus, causes the computing apparatus to perform a method comprising:

storing a continuous audio composition having plural tracks at least partially overlapping with one another in the temporal domain and having a specific alignment in the temporal domain;

obtaining time-varying audio characteristics of an audio recording;

identifying at least part of one of the plural tracks that corresponds to the audio recording;

using the time-varying audio characteristics of the audio recording to align the audio recording with said at least part of the identified track; and substituting said at least part of the identified track with the audio recording with substantially the same alignment in the temporal domain as said at least part of the identified track.

The computer-readable code when executed may further cause a computing apparatus to: for plural different temporal alignments between the audio recording and the identified track, determine a degree of correlation between the time-varying audio characteristics of the audio recording and corresponding time-varying audio characteristics of the identified track; identify a temporal alignment that provides a highest correlation; and substitute said at least part of the identified track with the audio recording using the identified temporal alignment.

The time-varying audio characteristics may comprise mel-frequency cepstral coefficient information, and/or chroma information, of respective frames wherein each frame has a length in the temporal domain.

The computer-readable code when executed may further cause a computing apparatus to: use the time varying audio characteristics of the audio recording to identify the one of the plural tracks that corresponds to the audio recording.

The computer-readable code when executed may further cause a computing apparatus to: use the time varying audio characteristics of the audio recording to determine a type or class of instrument used to produce the audio recording; and identify said one of the plural tracks, corresponding to the audio recording, by determining which track was produced using the same type or class of instrument.

The computer-readable code when executed may further cause a computing apparatus to: substitute said at least part of the identified track with the audio recording, with substantially the same alignment in the temporal domain as said at least part of the identified track, only if a measure of correspondence between the identified track and the audio recording exceeds a quality threshold.

The computer-readable code when executed may further cause a computing apparatus to: determine a quality value indicative of the degree of correspondence between said at least part of the identified track and the audio recording; and refrain from substituting said at least part of the identified track with the audio recording if the quality value is less than a predetermined amount.

The computer-readable code when executed may further cause a computing apparatus to: substantially align the substituted audio recording and a video associated therewith in the temporal domain.

The video associated with the substituted audio recording may be a video recording of a person creating said audio recording.

The computer-readable code when executed may further cause a computing apparatus to: obtain the audio recording and the video from a library if information associated with the video, also in the library, satisfies a predetermined condition.

Said information may be indicative of the number of times the video has been selected from the library, how often the video is selected from the library, or a user rating of the video.

The computer-readable code when executed may further cause a computing apparatus to: obtain the audio recording from a library if information associated therewith, also in the library, satisfies a predetermined condition.

Said information may be indicative of the number of times the audio recording has been selected from the library, how often the audio recording is selected from the library, or a user rating of the audio recording.

Substituting said at least part of the identified track with the audio recording with substantially the same alignment in the temporal domain as said at least part of the identified track may comprise: replacing said at least part of the identified track with the audio recording; or substantially silencing said at least part of the identified track and including a new track in the continuous audio composition, said new track containing the audio recording substantially in the same alignment in the temporal domain as said at least part of the identified track.

The computer-readable code when executed may further cause a computing apparatus to: use time varying audio characteristics of another audio recording to identify at least part of one of the plural tracks that corresponds to the other audio recording; if said previously identified at least part of the identified track is identified to be the at least part of the one of the plural tracks that corresponds to said other audio recording, then determine another quality value indicative of the degree of correspondence between said at least part of the identified track and the other audio recording; and substitute said at least part of the identified track with the audio recording associated with the highest quality value, provided it is not less than said predetermined amount.

A fourth aspect of the invention provides apparatus, the apparatus having at least one processor and at least one memory having computer-readable code stored thereon which when executed controls the at least one processor to:
  store a continuous audio composition having plural tracks at least partially overlapping with one another in the temporal domain and having a specific alignment in the temporal domain;
  obtain time-varying audio characteristics of an audio recording;
  identify at least part of one of the plural tracks that corresponds to the audio recording;
  use the time-varying audio characteristics of the audio recording to align the audio recording with said at least part of the identified track; and
  substitute said at least part of the identified track with the audio recording with substantially the same alignment in the temporal domain as said at least part of the identified track.

The computer-readable code, when executed, may further control the at least one processor to: for plural different temporal alignments between the audio recording and the identified track, determine a degree of correlation between the time-varying audio characteristics of the audio recording and corresponding time-varying audio characteristics of the identified track; identify a temporal alignment that provides a highest correlation; and substitute said at least part of the identified track with the audio recording using the identified temporal alignment.

The time-varying audio characteristics may comprise mel-frequency cepstral coefficient information, and/or chroma information, of respective frames wherein each frame has a length in the temporal domain.

The computer-readable code, when executed, may further control the at least one processor to: use the time varying audio characteristics of the audio recording to identify the one of the plural tracks that corresponds to the audio recording.

The computer-readable code, when executed, may further control the at least one processor to: use the time varying audio characteristics of the audio recording to determine a type or class of instrument used to produce the audio recording; and identify said one of the plural tracks, corresponding to the audio recording, by determining which track was produced using the same type or class of instrument.

The computer-readable code, when executed, may further control the at least one processor to: substitute said at least part of the identified track with the audio recording, with substantially the same alignment in the temporal domain as said at least part of the identified track, only if a measure of correspondence between the identified track and the audio recording exceeds a quality threshold.

The computer-readable code, when executed, may further control the at least one processor to: determine a quality value indicative of the degree of correspondence between said at least part of the identified track and the audio recording; and refrain from substituting said at least part of the identified track with the audio recording if the quality value is less than a predetermined amount.

The computer-readable code, when executed, may further control the at least one processor to: substantially align the substituted audio recording and a video associated therewith in the temporal domain.

The video associated with the substituted audio recording may be a video recording of a person creating said audio recording.

The computer-readable code, when executed, may further control the at least one processor to: obtain the audio recording and the video from a library if information associated with the video, also in the library, satisfies a predetermined condition.

Said information may be indicative of the number of times the video has been selected from the library, how often the video is selected from the library, or a user rating of the video.

The computer-readable code, when executed, may further control the at least one processor to: obtain the audio recording from a library if information associated therewith, also in the library, satisfies a predetermined condition.

Said information may be indicative of the number of times the audio recording has been selected from the library, how often the audio recording is selected from the library, or a user rating of the audio recording.

The computer-readable code may be such that substituting said at least part of the identified track with the audio recording with substantially the same alignment in the temporal domain as said at least part of the identified track comprises: replacing said at least part of the identified track with the audio recording; or substantially silencing said at least part of the identified track and including a new track in the continuous audio composition, said new track containing the audio recording substantially in the same alignment in the temporal domain as said at least part of the identified track.

The computer-readable code, when executed, may further control the at least one processor to: use time varying audio characteristics of another audio recording to identify at least part of one of the plural tracks that corresponds to the other audio recording; if said previously identified at least part of the identified track is identified to be the at least part of the one of the plural tracks that corresponds to said other audio recording, then determine another quality value indicative of the degree of correspondence between said at least part of the identified track and the other audio recording; and substitute said at least part of the identified track with the audio recording associated with the highest quality value, provided it is not less than said predetermined amount.

A fifth aspect of the invention provides apparatus configured to:
  store a continuous audio composition having plural tracks at least partially overlapping with one another in the temporal domain and having a specific alignment in the temporal domain;
  obtain time-varying audio characteristics of an audio recording;
  identify at least part of one of the plural tracks that corresponds to the audio recording;
  use the time-varying audio characteristics of the audio recording to align the audio recording with said at least part of the identified track; and
  substite said at least part of the identified track with the audio recording with substantially the same alignment in the temporal domain as said at least part of the identified track.

The apparatus may be further configured to: for plural different temporal alignments between the audio recording and the identified track, determine a degree of correlation between the time-varying audio characteristics of the audio recording and corresponding time-varying audio characteristics of the identified track; identify a temporal alignment that provides a highest correlation; and substitute said at least part of the identified track with the audio recording using the identified temporal alignment.

The time-varying audio characteristics may comprise mel-frequency cepstral coefficient information, and/or chroma information, of respective frames wherein each frame has a length in the temporal domain.

The apparatus may be further configured to: use the time varying audio characteristics of the audio recording to identify the one of the plural tracks that corresponds to the audio recording.

The apparatus may be further configured to: use the time varying audio characteristics of the audio recording to determine a type or class of instrument used to produce the audio recording; and identify said one of the plural tracks, corresponding to the audio recording, by determining which track was produced using the same type or class of instrument.

The apparatus may be further configured to: substitute said at least part of the identified track with the audio recording, with substantially the same alignment in the temporal domain as said at least part of the identified track, only if a measure of correspondence between the identified track and the audio recording exceeds a quality threshold.

The apparatus may be further configured to: determine a quality value indicative of the degree of correspondence between said at least part of the identified track and the audio recording; and refrain from substituting said at least part of the identified track with the audio recording if the quality value is less than a predetermined amount.

The apparatus may be further configured to: substantially align the substituted audio recording and a video associated therewith in the temporal domain.

The video associated with the substituted audio recording may be a video recording of a person creating said audio recording.

The apparatus may be further configured to: obtain the audio recording and the video from a library if information associated with the video, also in the library, satisfies a predetermined condition.

Said information may be indicative of the number of times the video has been selected from the library, how often the video is selected from the library, or a user rating of the video.

The apparatus may be further configured to: obtain the audio recording from a library if information associated therewith, also in the library, satisfies a predetermined condition.

Said information may be indicative of the number of times the audio recording has been selected from the library, how often the audio recording is selected from the library, or a user rating of the audio recording.

Substituting said at least part of the identified track with the audio recording with substantially the same alignment in the temporal domain as said at least part of the identified track may comprise: replacing said at least part of the identified track with the audio recording; or substantially silencing said at least part of the identified track and including a new track in the continuous audio composition, said new track containing the audio recording substantially in the same alignment in the temporal domain as said at least part of the identified track.

The apparatus may be further configured to: use time varying audio characteristics of another audio recording to identify at least part of one of the plural tracks that corresponds to the other audio recording; if said previously identified at least part of the identified track is identified to be the at least part of the one of the plural tracks that corresponds to said other audio recording, then determine another quality value indicative of the degree of correspondence between said at least part of the identified track and the other audio recording; and substitute said at least part of the identified track with the audio recording associated with the highest quality value, provided it is not less than said predetermined amount.

BRIEF DESCRIPTION OF THE DRAWINGS

Embodiments of the invention will now be described by way of non-limiting example with reference to the accompanying drawings, in which.

DETAILED DESCRIPTION OF EMBODIMENTS

Embodiments described herein concern the processing of audio information and relate in particular to the substitution of part of some audio information with other audio information. Embodiments of the present invention are described in the context of music, namely substituting audio information corresponding to one instrumental contribution with audio information corresponding to a cover of that instrumental contribution. For instance audio information corresponding to the acoustic guitar contributions in a folk song can be substituted with audio information corresponding to a cover version of the acoustic guitar contributions recorded by a user. This allows a listener to hear the cover version of the acoustic guitar in place of the original guitar upon playback.

Figure 1:
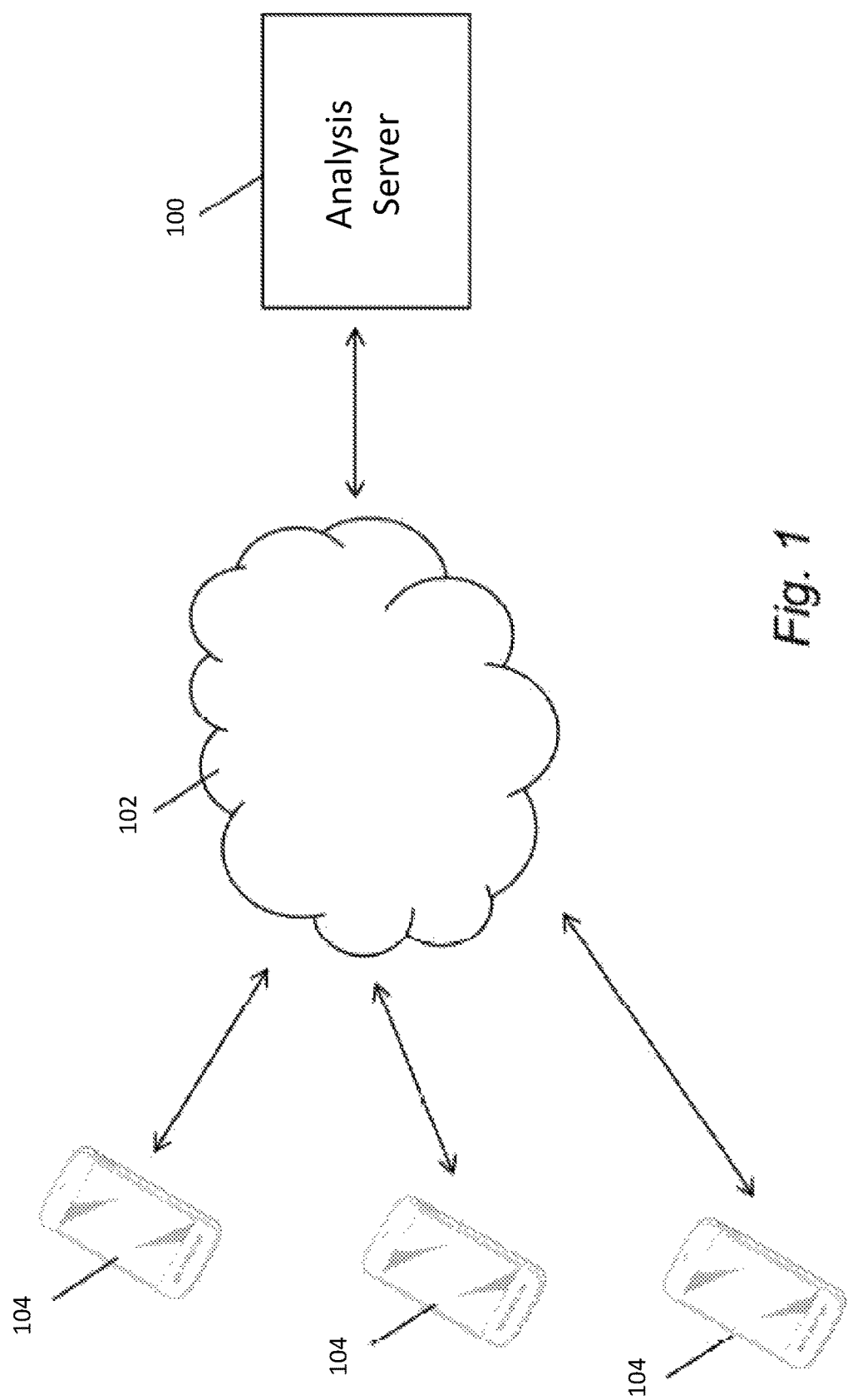
FIG. 1 is schematic diagram of a system according to various embodiments.

Referring to FIG. 1, an analysis server 100 is shown connected to a network 102, which can be any data network such as a Local Area Network (LAN), Wide Area Network (WAN) or the Internet. The analysis server 100 is configured to receive and process audio information transmitted from one or more terminals 104 via the network.

In the present example, three terminals 104 are shown, each incorporating audio capture (i.e. microphone) hardware and software for the capturing, storing and uploading and downloading of audio data over the network 102. As well as audio information the analysis server 100 may receive video information in a similar manner from any terminals 104 incorporating video capture (i.e. video camera) hardware and software for the capturing, storing and uploading and downloading of video data over the network 102.

Suitable terminals 104 will be familiar to persons skilled in the art, for instance a smart phone could serve as a terminal 104 in the context of this application although a laptop, tablet or desktop computer may be used instead. Such devices include microphone, camera, music and video playback and data storage functionality and can be connected to the music analysis sever 100 via a cellular network, Wi-fi, Bluetooth or any other suitable means such as a cable or wire.

Figure 2:
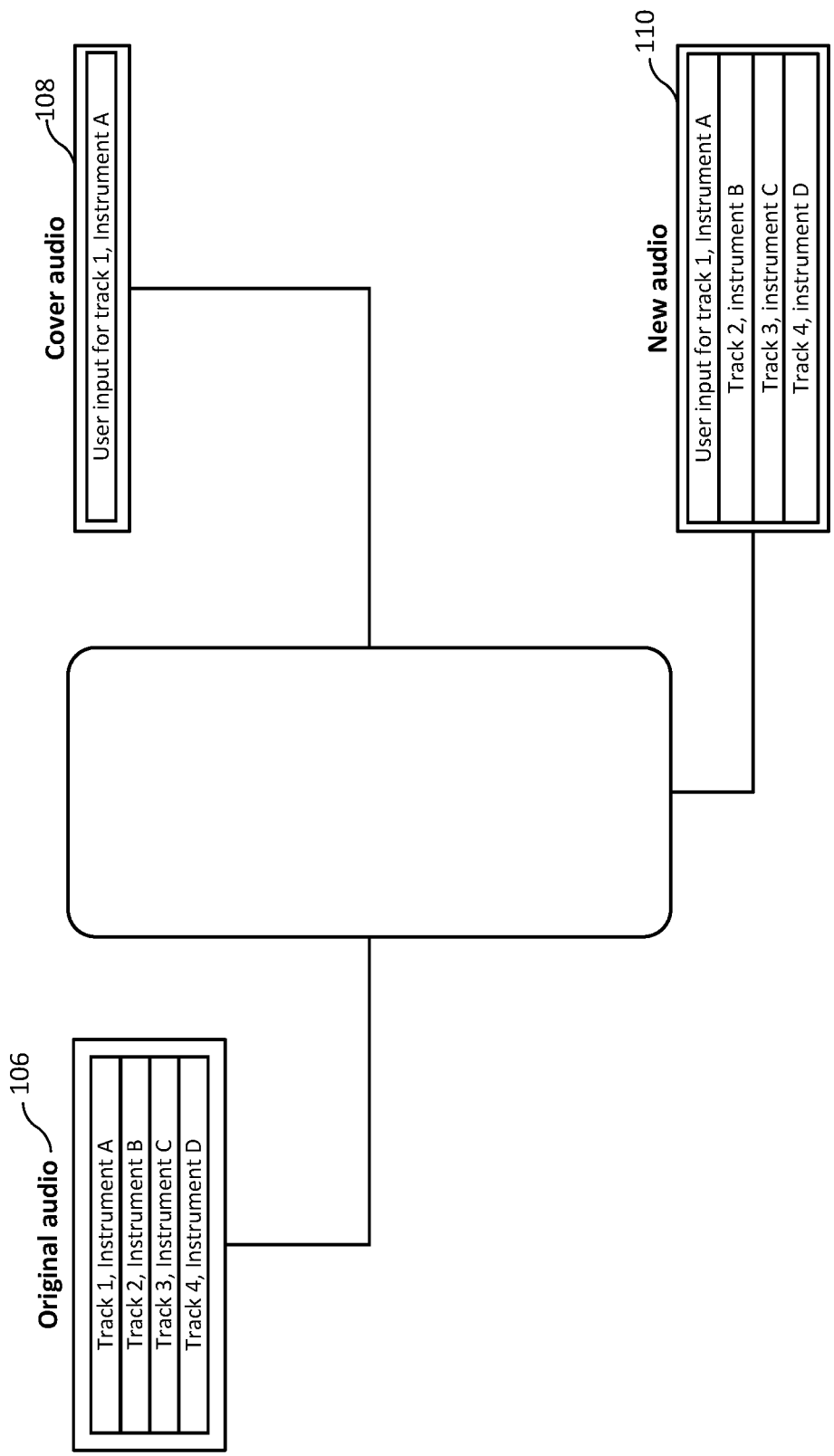
FIG. 2 is a high level illustration of some functionality according to various embodiments.

FIG. 2 broadly illustrates, at a high level, some functionality of the present embodiments. When a user has recorded themselves playing a cover of the contribution made by one instrument to a song, audio information corresponding thereto (hereafter "cover audio 108") is provided from their terminal 104 to the analysis server 100.

The analysis server 100 accesses electronically stored audio information corresponding to the original version of the song covered by the user (hereafter "original audio 106"). This original audio 106 may be provided to the analysis server 100 by the user from their terminal 104, or it may be retrieved from a memory by the analysis server 100 upon receiving an indication of the song covered by the user. Such a memory may comprise part of the analysis server 100 or is accessible thereto via the network 102.

The part of the original audio 106 which the cover audio 108 corresponds to is identified (hereafter "relevant audio"). In other words, the relevant information in the original audio 106, which corresponds to the instrumental contributions covered by the user, is identified. Continuing with the previous example, if the user covered the acoustic guitar in a folk song, relevant audio information corresponding to the acoustic guitar, played by the original artist, is identified among the original audio 106.

Logic accessible to the analysis server 100 substitutes the relevant audio with the cover audio 108. In other words, the relevant audio is replaced with the cover audio 108, thereby resulting in "product audio" 110. The product audio 110 is made accessible to the user, for instance by transmitting it back to their terminal 104, such that when it is played back the user's contribution to the song is heard in place of the part covered. In other words, a listener hears the user's version of the acoustic guitar in place of the original acoustic guitar.

Figure 3:
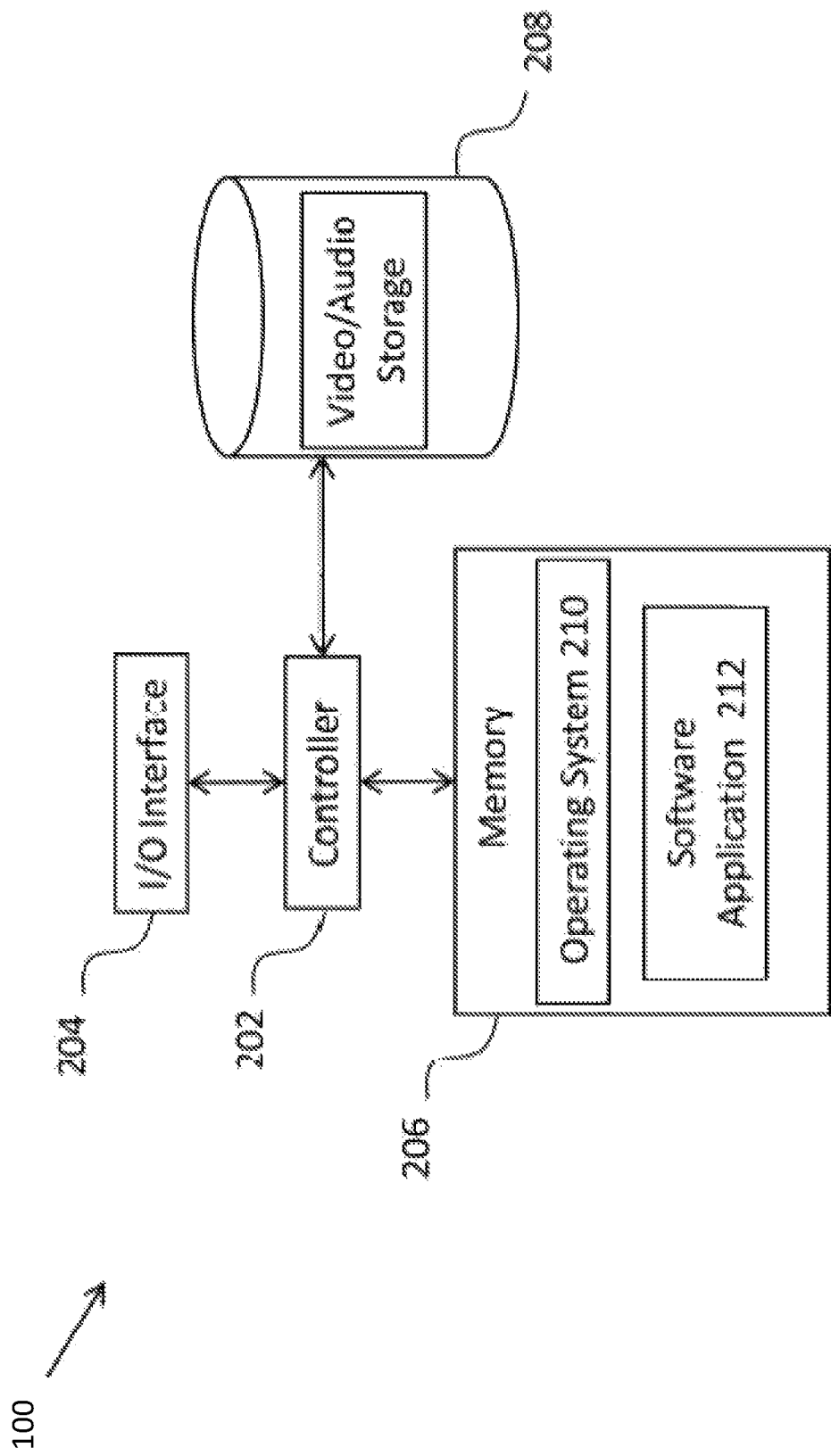
FIG. 3 is schematic diagram of some components of an analysis server shown in FIG. 1.

Referring to FIG. 3, hardware components of the analysis server 100 are shown. These include a controller 202, an input and output interface 204, a memory 206 and a mass storage device 208 for storing video and audio data. The controller 202 is connected to each of the other components in order to control operation thereof.

The memory 206 (and mass storage device 208) may be a non-volatile memory such as read only memory (ROM) a hard disk drive (HDD) or a solid state drive (SSD). The memory 206 stores, amongst other things, an operating system 210 and may store software applications 212. RAM (not shown) is used by the controller 202 for the temporary storage of data. The operating system 210 may contain code which, when executed by the controller 202 in conjunction with RAM, controls operation of each of the hardware components and provides an environment in which the or each software application 212 can run.

The controller 202 may take any suitable form. For instance, it may be a microcontroller, plural microcontrollers, a processor, or plural processors.

A software application 212 is configured to control and perform audio and video data processing by the analysis server 100. The operation of this software application 212 will now be described in detail.

Figure 4A:
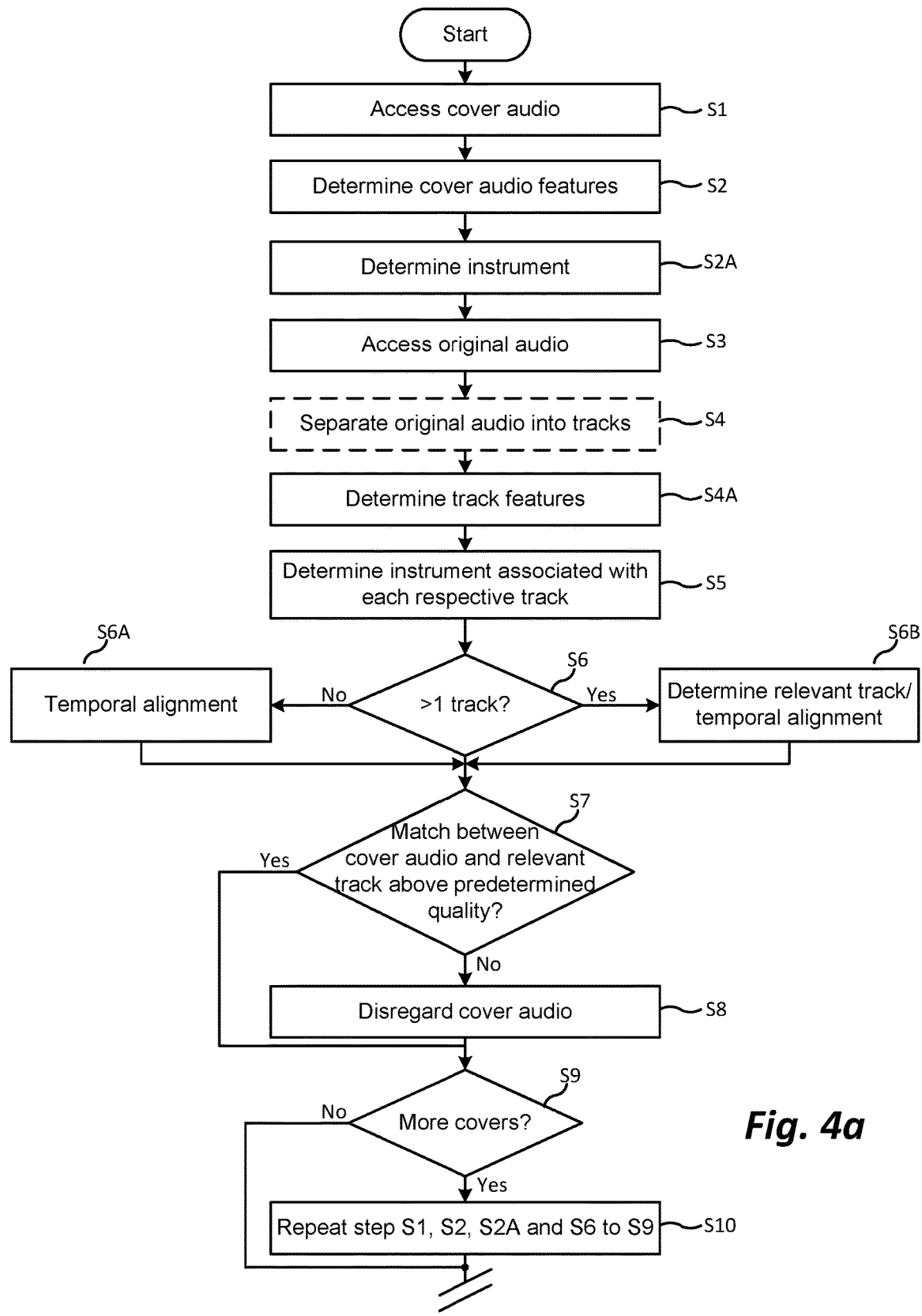
FIGS. 4a to 4c illustrate functionality of a software application in FIG. 3.

The flow diagram beginning in FIG. 4a illustrates functionality of the software application 212. When run, the software application 212 causes the controller 202 in step S1 to access cover audio 108. This cover audio 108 corresponds to a recording of the contribution made by one instrument to an audio composition, as played by a user. In other words the controller 202 accesses an electronically stored version of the cover audio 108, which could for instance be a recording of a user playing the acoustic guitar contributions to their favourite folk song.

In step S2 the software application 212 causes the controller 202 to determine features of the cover audio 108. In the present example one feature determined is the Mel-frequency cepstral coefficients (MFCC) of respective temporal frames of cover audio 108, which can be determined using one of various techniques known in the art. One suitable technique which may be used to determine the MFCCs of respective temporal frames of cover audio 108 is described between page 38, line 16 and page 39, line 34 of WO2012/001216, the contents of which are incorporated herein by reference. Another feature of the cover audio 108 which is determined by the controller 202 in step S2 is the chroma of respective temporal frames of cover audio 108, which can also be determined using one of various techniques known in the art. Co-pending UK patent application number 1310861.8 describes between page 21, line 22 and page 22, line 7 a technique that may be used to extract the chroma feature of respective temporal frames of cover audio 108, and the contents of this UK patent application are incorporated herein by reference.

For completeness, some of the disclosure of the above mentioned patent applications, which describes how to calculate MFCCs and chroma of respective temporal frames of audio, is included herein towards the end of the description.

In step S2A the software application 212 causes the controller 202 to determine which type of instrument the cover audio 108 corresponds to, or in other words which type of instrument was played to produce the cover audio 108. This can be achieved by comparing the one of more features of the cover audio 108, determined in step S2, with a database associating different instrument types with predetermined features of audio produced using respective instruments. More specifically this database contains records for a variety of different instruments, each such record containing information indicative of at least one feature of audio that was previously made using the instrument corresponding to that record.

In the present example for instance, each record in the database associates a type of instrument (e.g. acoustic guitar) with a Gaussian mixture model trained using the MFCCs of audio previously made using that type of instrument (another approach however is to train a probabilistic model to represent the distribution of features extracted from the audio signals captured from each instrument, and then compare the features extracted from the input audio signal to each of the models; the model which has the largest likelihood of having generated the features is our most likely instrument). Continuing with the initial approach, such training can be performed using the well-known expectation maximization algorithm which iteratively adjusts the model parameters such that the likelihood of the model having generated the input feature sequence is maximized. Thus by comparing the MFCCs of one or more respective frames of cover audio 108 determined in step S2 with the models in the database, the type of instrument used to produce the cover audio 108 can be determined by identifying the instrument type in said database which is associated with the Gaussian mixture model having corresponding to the largest likelihood of having generated the MFCCs. Such likelihood evaluation can be performed using the Viterbi algorithm, for example. It will be appreciated that such a database may be stored in the mass storage device 108, or remotely and can be accessible to the analysis server 100 via a network for instance.

The approach mentioned in the foregoing paragraph for recognising the type of instrument used to produce cover audio 108 is based on the MSc thesis entitled "Automatic Musical Instrument Recognition" by Antti Eronen, approved by the Tampere University of Technology; Tampere, October 2001; the contents of which are incorporated herein by reference. Pages 41 through 43 of this document describe the training of Gaussian mixture models, and the section 6.4 on page 55 describes the use of Gaussian mixture models for instrument recognition. The author mentions that first order time derivatives (a.k.a. delta MFCCs) and the spectral centroid may be used as additional features for instrument recognition. Page 53 of this document describes an alternative method of identifying an instrument from its sound which could be used in the context of the present invention. This alternative method involves using a hierarchy of different instrument types and families, wherein each node of the hierarchy applies knowledge of features to distinguish between possible subclasses. In this alternative method, a set of different features are extracted from notes played by different instruments, and then the classification of the instrument is done using, for example, a k-nearest neighbors classifier comparing the features extracted from the input note to features extracted from a plurality of reference notes. It is further mentioned that to apply this method to a continuous melody played by an instrument, a note segmentation step needs to be performed first.

Furthermore, it will be appreciated that instead of automatically recognizing the instrument in step S2A, the user may manually input the identity of the instrument, such as piano, saxophone, acoustic guitar, electric guitar, or the like. The inputting can happen at the user's terminal 104 as text or by selecting from a list of instrument names or instrument pictures. In some cases, the identification may happen as a combination of user input and automatic recognition, for example, such that the system first attempts to automatically recognize the instrument and if the automatic instrument recognition fails or the confidence of the automatic instrument recognition is lower than a predefined threshold confidence, the system will prompt the user to provide the identity of the instrument.

In step S3 the software application 212 causes the controller 202 to access original audio 106 corresponding to a recording of the original version of the aforementioned audio composition covered by the user. In other words the controller 202 accesses an electronically stored version of the original audio 106, which in the present example is an electronically stored version of the user's favourite folk song.

Audio information corresponding to an audio composition such as music in a form comprising plural tracks of audio information (hereafter "multi-track format") is obtained and stored. These tracks at least partially overlap with one another in the temporal domain and have a specific arrangement relative to one another in the temporal domain. In the case of electronically stored music (e.g. a folk song), respective tracks of audio information are known to correspond to the contributions made by respective instruments or voices to the overall musical composition. In other words, each track contains audio information produced using a single instrument or singer. Different tracks of a song associated with the various contributions made by respective instruments or singers are arranged in the temporal domain relative to one another such that, when played back, the original song is heard. One track of a song may correspond to a recording of an acoustic guitar for instance. Another track may correspond to a recording of a singer's contributions to the song, whereas another track may correspond to a recording of the drum or bass contributions. This is illustrated by the original audio 106 in FIG. 2 which is shown to comprise different tracks, each of which contains audio information produced using a different instrument.

If the original audio 106 accessed in step S3 is not stored in multi-track format then the software application 212 causes the controller 202 to separate the original audio 106 into a plurality of tracks. In other words the controller 202 converts the original audio 106 into multi-track format in step S4.

In particular, the controller 202 may perform a search to a service providing multitrack versions of original musical pieces. An example is the Web site http://www.karaoke-version.com/.

Alternatively, or in the case the search of a multitrack version fails, the controller 202 can work out in step S4 which parts of the original audio 106 were produced using respective instruments. Reference is again made to FIG. 2, wherein the original audio 106 is shown to represent multiple layers of sound produced using different types of instruments. Step S4 thus involves the controller 202 determining which parts of the original audio 106 correspond to respective layers of sound. After determining this, the controller 202 separates the various parts of original audio 106 into respective tracks, which are arranged relative to one another in the temporal domain such that when played back the original audio composition is heard. Various techniques for implementing this functionality will be apparent to persons skilled in the art. For example, the method presented in "Music signal separation by supervised nonnegative matrix factorization with basis deformation", by Kitamura, D., Saruwatari, H.; Shikano, K.; Kondo, K.; Takahashi, Y., In Proc. of the 18th International Conference on Digital Signal Processing (DSP), 2013, could be used; the contents of which are incorporated herein by reference.

The controller 212 then in step S4A performs a similar analysis on each track of the original audio 106, as was described in connection with step S2. More specifically the same features as were determined for the cover audio 108 in step S2 are determined in the same manner for each track of the original audio 106, which in the present example are the first order MFCCs and the chroma feature of respective temporal frames of audio.

In step S5 the controller determines which type of instrument was used to produce each track of the original audio 106 in the same manner as that previously described in connection with step S2A. In particular, the controller 202 compares the MFCCs of one or more frames in each respective track of original audio 106 with the aforementioned database of trained Gaussian mixture models for each instrument in order to determine the type of instrument used to produce each track.

It will be appreciated that in some situations, for instance when the controller was able to obtain a multitrack version of the original audio 106, the controller 212 can in step S5 determine the identities of instruments used to produce each respective track of the multitrack recording from textual metadata descriptions associated with the multitrack recording.

In step S6 the controller 202 determines which tracks of the original audio 106 were produced using the same type of instrument as the cover audio 108. If there is only one then this track was the one covered by the user when the cover audio 108 was recorded, and is referred to hereafter as the "relevant track". The method then proceeds to step S6A.

In step 6A, the controller 202 is caused to match the cover audio 108 with the relevant track. This involves the controller 202 substantially aligning the cover audio 108 and the relevant track relative to one another in the temporal domain. One way of doing this is for the controller 202 to calculate the correlation between features of the cover audio 108, and corresponding features of the relevant track, for different time lags.

In the present example, these features are the chroma of respective frames of audio (which describes the melodic and harmonic content of the associated audio) and the MFCCs of respective frames of audio (which describes the shape of the spectrum of the associated audio).

The controller 202 thus determines a correlation between the chroma of respective frames of audio comprising the relevant track, and the chroma of corresponding respective frames of audio comprising the cover audio 108. Additionally the controller 202 determines a correlation between the MFCCs of respective frames of audio comprising the relevant track, and the MFCCs of corresponding respective frames of audio comprising the cover audio 108.

It will be appreciated that the frames of the relevant track, for which MFCCs have been determined, are of the same length in time as the frames thereof for which chroma has been determined. Also the frames of the cover audio 108, for which MFCCs have been determined, are of the same length in time as the frames thereof for which chroma has been determined.

The correlation between the aforementioned features is determined for different time lags between the cover audio 108 and the relevant track. The time lag for which the highest correlation occurs is determined to be that required in order to align the cover audio 108 and the relevant track in the temporal domain, which is needed in later steps in particular steps S11 and S16.

It will be appreciated that just one type of feature may be used for alignment purposes, for instance MFCCs or chroma. In this case, the alignment for which the highest degree of correlation of that particular feature is determined is used later on, in particular in steps S11 and S16. It will also be appreciated, that the alignment can be done using several features, for example, MFCCs and chroma, such that correlation is determined for each feature separately and then the correlation results are combined. In this case, the frames where different features have been extracted can have a different length for each feature, such as MFCC or chroma.

Furthermore, it will be appreciated that the foregoing teaching may be applied to identifying which part of a relevant track cover audio 108 corresponds to in the situation that a user did not cover the entire length of an audio composition. In the present example, this would arise if a user did not cover the entire acoustic guitar contribution to a folk song and instead they only played part of it. In this case the controller 202 would temporally align the cover audio with the part of the relevant track covered by the user.

If a user covered a repeating part of a song only (chorus, for example), the contribution could be aligned to multiple places in the original track. In other words, all choruses could be covered by playing it only once.

Going back to step S6, if the controller 202 determines that more than one track of original audio 106 was produced using the same type of instrument as the cover audio 108 (hereafter the "identified tracks"), further processing is required to determine the relevant track. This situation could arise in the present example where a user covers the acoustic guitar contributions to a folk song. This is because some folk songs contain contributions from two guitars, for instance a lead acoustic guitar and one or more rhythm acoustic guitars. The method then proceeds to step S6B.

In step S6B the controller 202 is caused to match the cover audio 108 with each of the identified tracks. This involves the controller 202 substantially aligning the cover audio 108 and each of the identified tracks relative to one another in the temporal domain. One way of doing this is for the controller 202 to calculate the correlation between features of the cover audio 108, and corresponding features of each respective identified track, for different time lags.

Keeping in line with the present example, these features are the chroma and the MFCCs of respective frames of audio. The controller 202 thus determines for each respective identified track, a correlation between the chroma of respective frames of audio comprising the identified track, and the chroma of corresponding respective frames of audio comprising the cover audio 108. Additionally the controller 202 determines for each respective identified track, a correlation between the MFCCs of respective frames of audio comprising the identified track, and the MFCCs of corresponding respective frames of audio comprising the cover audio 108.

It will be appreciated that the frames of each identified track, for which MFCCs have been determined, are of the same length in time as the frames thereof for which chroma has been determined. Also the frames of the cover audio 108, for which MFCCs have been determined, are of the same length in time as the frames thereof for which chroma has been determined.

The correlation between the aforementioned features is determined for different time lags between the cover audio 108 and the identified tracks. The identified track which is found to have the highest correlation with the cover audio 108 upon implementing this analysis is determined to be the relevant track (i.e. the track covered by the user when they recorded the cover audio 108). Knowing the time lag between the cover audio 108 and the relevant track, at which the highest value of correlation was determined, helps to substantially align the cover audio 108 with the identified track in the temporal domain, which is useful in later steps in particular step S11 and S16.

It will be appreciated that when performing step 6B, alternatively, correlation values for the two respective features could be determined separately and then combined, as above. In particular, the alignment can be done using several features, for example, MFCCs and chroma, such that correlation is determined for each feature separately and then the correlation results are combined. In this case, the frames where different features have been extracted can have a different length for each feature, such as MFCC or chroma.

In step S7 the controller 202 determines whether the correlation between the cover audio 108 and the relevant track, is above a predetermined level. If no, the processor 202 is caused in step S8 to disregard the cover audio 108 before proceeding to step S9. This can involve the processor 202 being caused to delete any information corresponding to the cover audio 108 stored in RAM. If yes, the method proceeds from step S7 directly to step S9.

In step S9 the software application 212 causes the controller 202 to determine whether there is any more cover audio information. In other words the controller 202 determines whether there are any further recordings of people covering other instrumental contributions to the original audio composition, which in the present example is a folk song. If yes, then steps S1, S2, S2A and S6 to S9 heretofore described are repeated in step S10 for each respective cover audio recording 108. In this way each respective cover audio recording 108 is associated with a corresponding track of the aforementioned folk song, provided the condition in step S7 is met. However, if the controller 202 determines no in step S9 the method proceeds to step S11, S15 or S16 described in more detail below.

In step S11, for each cover audio recording 108 that has not been discarded, a reproduction quality value is calculated. This value is indicative of the quality of the recording defined by the cover audio information, and more specifically indicates how closely the recording of the original was covered and/or how good is the technical quality of the cover audio recording. In the example of a cover audio recording 108 which corresponds to the acoustic guitar contributions of a folk song, the reproduction quality value is indicative of how close the cover version sounds, upon playback, to the original version of the acoustic guitar. The technical quality may relate, for example, to the lack of distortion in the cover audio recording and/or spectral balance of the cover audio recording and/or its sampling rate and/or sample resolution and/or the like.

One way to calculate the reproduction quality value of some cover audio 108 is for the controller 202 to calculate a value indicative of the degree of correspondence between said cover audio 108 and the relevant track of original audio 106 with which it is associated, when the two are temporally aligned (as determined in step S6A or S6B). This can be achieved by determining the correlation between features of the identified track, and features of the cover audio 108, in substantially the same manner as in steps S6A and S6B, for respective windows of length N along the temporal domain (otherwise referred to as frames). The higher the correlation in a particular temporal window, the more closely the relevant track was covered in that temporal window. Thus by calculating an average (mean or median) of the correlation across all frames for a respective feature (e.g. chroma or MFCCs), the reproduction quality with respect to that feature can be determined.

In the present example the correlation between MFCCs of respective frames of the relevant track, and MFCCs of corresponding respective frames of the cover audio 108, is determined for all frames of the cover audio 108. The MFCC values mentioned in the previous sentence can be determined by the controller 202 upon implementing one of various techniques known in the art, such as the one specifically mentioned in connection with step S2. Then an average (mean or median) of the determined MFCC correlation values is calculated and used as the reproduction quality value. Alternatively or in addition to, in particular for singing, one could use quality metrics like the one described in Nichols, E., DuHadway, C., Aradhye, H., and Lyon, R. "Automatically Discovering Talented Musicians with Acoustic Analysis of YouTube Videos," IEEE International Conference on Data Mining (ICDM). December 2012, Brussels, Belgium; the contents of which are incorporated herein by reference.

It will be appreciated that the reproduction quality value thus represents how well the original version of an audio composition was covered across the entire temporal length of the cover audio 108. Increasing the number of temporal windows analysed, by decreasing their length N, provides a more accurate reproduction quality value.

In step S11 the reproduction quality value of each cover audio recording 108 is determined. Then in step S12, any cover audio recordings for which the reproduction quality value does not meet a predetermined reproduction quality condition are discarded. This can involve the processor 202 deleting from RAM any information corresponding to cover audio 108 which has a reproduction quality value not in compliance with the reproduction quality condition. One such reproduction quality condition may require cover audio recordings to be above a predetermined reproduction quality threshold, meaning that their respective reproduction quality values must be above a threshold amount.

In step S13 a determination is made by the controller 202 as to whether any cover audio 108 has not been discarded. If no, the method implemented by the controller 202 ends. If yes, the method proceeds to step S14.

In step S14 the controller 202 determines if more than one cover audio recording 108 corresponds to a single relevant track. This may occur if two people have covered the same track of a song, e.g. they both covered the acoustic guitar contributions of a folk song. In this situation the controller 202 is caused to disregard the cover audio 108 (associated with the relevant track for which more than one cover audio recording is present) which least closely matches the reproduction quality condition mentioned in step S12.

In step S15, the controller 202 can be caused by the software application 212 to apply one or more sound effects to the (or each) cover audio recording 108 that has not been discarded. Possible sound effects will be familiar to skilled persons and include at least panning, volume and echo, delay, reverberation, dynamic range compression etc. Sound effects used in the original audio 106 can be applied to the remaining cover audio recordings 108. For instance, in the present example, the folk song covered may be associated with an echo effect and therefore in step S15 a similar echo effect can be applied to the cover audio 108 which has not been discarded.

In step S16, each relevant track of original audio 106 is substituted by a temporally aligned cover audio recording 106 corresponding thereto (if such cover audio has not been discarded). At this stage, the time lag between each remaining cover audio recording 108 and its associated relevant track, for which the highest correlation value was determined in step S6A or S6B, is used for purposes of temporal alignment. In particular, this time lag is used by the controller 202 to substantially temporally align each remaining cover audio recording 108 and its associated relevant track. Each relevant track of original audio 106 is then substituted by the remaining cover audio recording 108 associated therewith.

To match the loudness of each remaining cover audio recording 108 to the loudness of its corresponding original track, the amplitude of the cover audio recording 108 is scaled such that the root-mean-square (RMS) energies of the cover audio recording 108 after amplitude scaling and the original are substantially equal. Substitution can in some embodiments be performed by substituting the audio samples of the audio track with the audio samples of the cover audio recording 108, after its amplitude has been scaled appropriately. In some embodiments, there may be a short cross fading section of the order of one second in duration, during which a weighted linear combination is taken from the cover audio recording 108 and the original sound track. To elaborate, the amplitude of the original sound track may be ramped down with a linear or half-hanning window while simultaneously ramping up the amplitude of the cover audio recording 108. This will reduce the audible effect of transitioning from the original audio track to the cover audio recording 108. Correspondingly, in a section where a transition needs to be done from the cover audio recording 108 to the original sound track, an lowering amplitude window is used to scale down the volume of the cover audio recording and an increasing amplitude window is used to ramp up the original sound track amplitude.

Furthermore it will be appreciated that the foregoing teaching may be applied to substituting part of a relevant track with corresponding cover audio 108, in the situation that a user did not cover the entire length of an audio composition. In the present example, this would arise if a user did not cover the entire acoustic guitar contribution to a folk song and instead they only played part of it. In this case only the part of the relevant track which the user covered would be substituted with cover audio provided by the user.

In step S17, the controller 202 down mixes the audio information arising from implementing the preceding step, which results in product audio 110 (see FIG. 2). When down mixing is implemented, the various tracks of audio information being down mixed can be merged such that the product audio 110 is electronically stored in two track format, said tracks corresponding to L and R channels respectively for stereo playback. As an alternative to two track stereo format, any desired number of downmixed number of channels could be used, such as one corresponding to mono, or multichannel such as 5.1 or 7.1. channel format.

It will be appreciated that in some cases all of the tracks in the original audio 106 have been replaced by cover audio in step S16. The product audio 110 produced in this case is thus a complete cover of the audio composition represented by the original audio 106. However if fewer than all tracks of the original audio 106 are replaced in step S16 then the resulting product audio 110 is a partial cover of the aforementioned audio composition.

Continuing with the example of a user covering the acoustic guitar in a folk song, if a track of the original audio 106 has been replaced with audio information corresponding to the acoustic guitar contributions as played by a user, then when the product audio 110 is played back the cover version of the acoustic guitar is heard alongside the other instruments/voices, instead of the acoustic guitar as played by the original artist. Implementing the foregoing method steps a user can make a cover version of an audio composition even though not enough musicians are available to cover all of the instruments heard in the original version.

In step S18 the controller 202 determines whether a cover video is to be created. If no, access is provided to the product audio 110 in step S19 and then the method ends. Providing access to the product audio 110 can involve the controller 202 causing a copy of the product audio 110 to be sent by the analysis server 100 to the terminal 104 of each user who made a contribution to the product audio 104. Alternatively, the product audio 110 may be stored in the mass storage device 108 and a link is provided to user terminals 104 which, when accessed, allows the terminals 104 to download or stream the product audio 110 from the analysis server 100.

If the controller determines yes in step S18, the method moves onto step S20. Here the controller 202 accesses electronically stored video information corresponding to respective user provided videos. Each such video may be a recording of a user performing their contribution to the product audio 110.

In step S21 the controller 202 creates a video corresponding to the product audio 110 (hereafter "cover video"). If the product audio 110 is a complete cover of an audio composition then the resulting cover video may be caused to show the individual videos provided by respective contributing users next to one another on a screen when played back. Alternatively the cover video may be made such that, when played back by a media player for instance, the down mixed product audio 110 is heard, and the cover video shows the respective video recordings of different contributing users (next to one another, if more than one) whenever their contribution is heard. In other words a particular contributing user's video does not appear in the cover video unless audio contributed by them can be heard, when the cover video is played back. Alternatively, the system may switch the video angle between the video recordings of the contributing users. For example, when a cover audio track containing a certain instrument starts, it may be desirable to switch the video view to the video provided by this user. After a while, the view can switch back to one of the other active users.

If the product audio 110 is a partial cover of an audio composition then the cover video may be caused to show the video(s) provided by the contributing user(s) on top of the original music video. This original music video can be accessed by the analysis server 100 in the same manner as the original audio 106, for instance by receiving it from a user terminal 104, or retrieving it from memory upon receiving an indication of the song covered by the user. In one example the cover video can be made such that, when played back, the down mixed product audio 110 is heard and the video recording of the user(s) appears whenever their contribution is heard. In other words a particular contributing user does not appear in the cover video unless audio contributed by them can be heard, when the cover video is played back. When no user contribution is being heard the original music video can be shown. For instance if the acoustic guitar in a folk song was covered by a single user, the original music video may be shown without the user provided video when the acoustic guitar contributions of the user are not heard in the cover video upon playback; this could occur during a singer's solo when all other instruments are supposed to be silent.

Techniques for engineering music videos are well known and can be applied by persons skilled in the art in the current context to implement step S21. For example, the creation of the music video can be performed as follows: the original music video can be demultiplexed to a video part and audio track part. The audio track part may be substituted with the product audio 110 obtained in step S17. The visual part may be modified by superimposing the or each user contributed video(s) as small frames on top of the original video. Such superimposing can be done, for example, by decoding the original video into frames; decoding the or each user contributed video(s) to frames; for each original video frame checking whether one or more user contributed videos are to be included; creating a required number of crop-regions in the original video frame to contain the user contributed video(s); resealing the user contributed video frame(s) to match the size of the crop region; substituting the crop-region(s) of the original video frame with the corresponding resealed user video frame(s); continuing this to all frames of the music video; and in the end encoding the video again. Finally, the encoded, modified video is multiplexed with the product audio 110. The foregoing steps could be implemented by the controller 202.

In step S22, the controller 202 provides access to the cover video (which will be understood to include information corresponding to the down mixed product audio 110, such that when played back, the cover video produced in step S21 is shown and sound corresponding to the down mixed product audio 110 made in step S17 is heard). Providing access to the cover video can involve the controller 202 causing the analysis server 100 to send a copy of the cover video to the terminal 104 of each user who made a contribution to the cover video. Other ways of providing access to the cover video will be apparent, for instance storing the cover video in the mass storage device 108 and providing a link to user terminals 104 which, when accessed, allows the respective terminals 104 to download or stream the cover video from the analysis server 100.

Figure 4B:
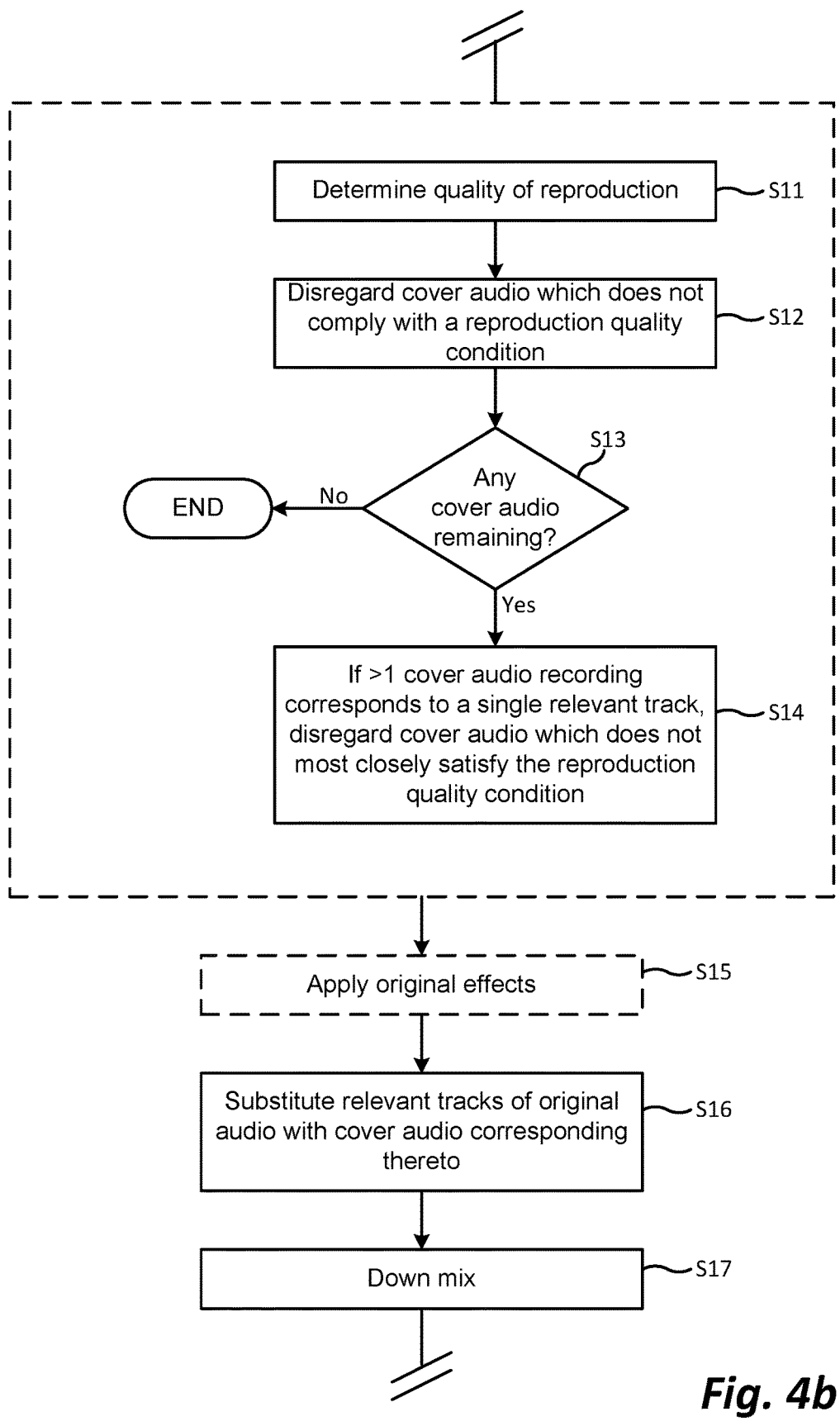
Figure 4C:
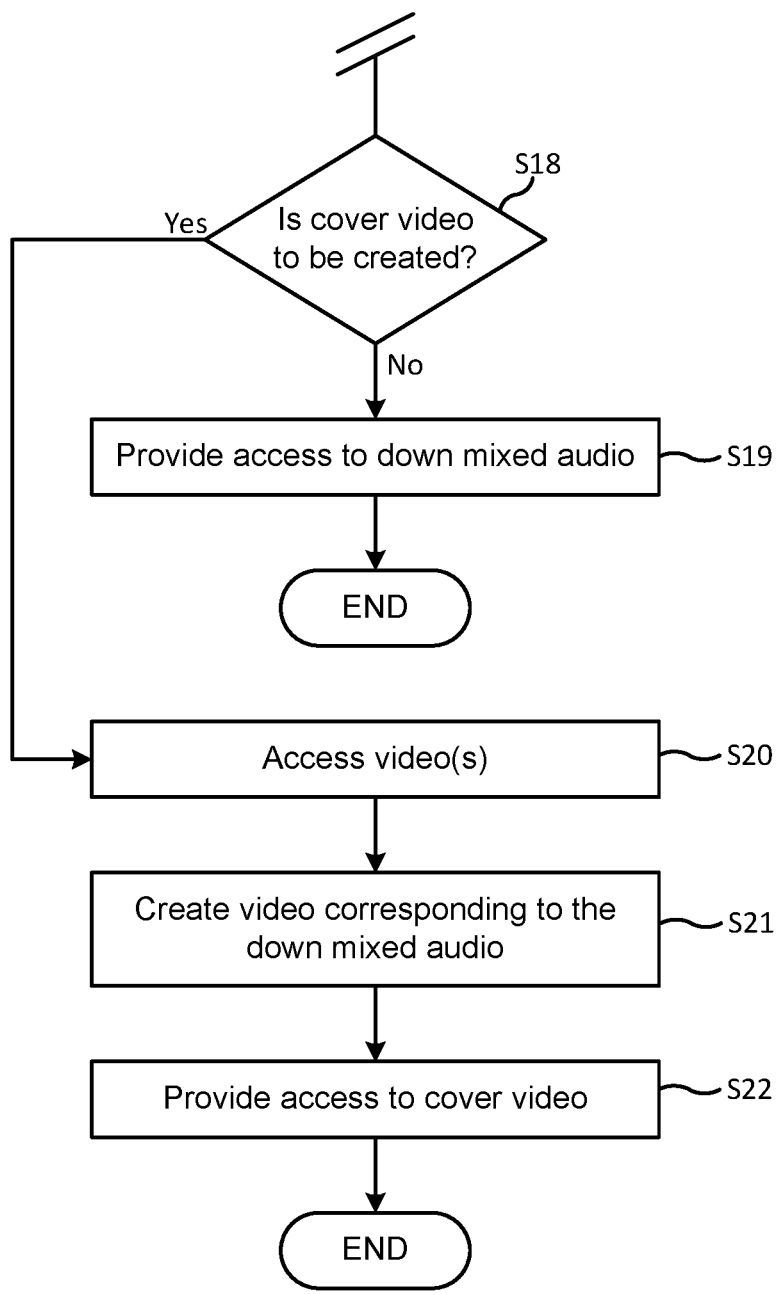

After implementing step S22 the method ends (see FIG. 4*c*).

The analysis server 100 may build up a library of cover audio recordings 108. Such a library can be stored in the mass storage device 208 for example, or in another memory accessible to the server 100 via a network e.g. a LAN, WAN or the internet. Each respective record in the library can relate to a particular audio composition and entries therein may comprise cover audio recordings 108 of different users performing respective parts of the overall audio composition.

Continuing with the example of folk songs, one record in the library may correspond to a particular folk song and entries in this record may comprise cover audio recordings 108 of different users performing respective contributions of different instruments to the overall song.

The above mentioned library can be built up by users implementing the method illustrated in FIGS. 4*a* to 4*c*. In particular when a user provides cover audio 108 in the making of a cover of an audio composition (or cover video), the cover audio 108 can be stored in the library in a record specific to that audio composition.

A user can interact with a software application on their terminal 104 to gain access to the library. In particular, in the instance that a record in the library associated with an audio composition contains multiple records, a user can create a (complete or partial) cover version of that audio composition by selecting which of these recordings they would like to hear in the cover version. This can be achieved by the user interacting with software on their terminal 104, thereby causing it to send instructions to the controller 202 so that the controller is caused to build up a cover version of the audio composition using the cover audio recording(s) 108 selected by the user from the library; this cover version then being made accessible to the user.

In the example of a user's favourite folk song, the user may wish to create a cover version including covers of the acoustic guitar contributions (recorded by them) and bass guitar contributions (recorded by a friend). The user therefore selects the desired cover audio recordings 108 from the library record associated with the relevant song. These cover audio recordings 108 are then included in an original version 106 of the folk song by the controller 202. This is achieved by causing the controller 202 to implement as many of the method steps S1 to S19 as are necessary to formulate the desired cover version of the folk song.

It is envisaged that in the example of the previous paragraph, the acoustic guitar contributions recorded by the user may not be stored in the library and could be provided separately at the time when the cover version of the song is requested to be made. In this case, only cover audio corresponding to the bass guitar contributions is accessed from the library and subsequently down mixed with cover audio corresponding to the acoustic guitar contributions provided by the user, when implementing as many of the method steps S1 to S19 as are necessary to provide the desired cover version of the folk song.

It is possible to impose a requirement that cover audio 108 may only be stored in the library if it was previously able to be down mixed into a cover version of an audio composition, when the method in FIGS. 4a to 4c was implemented. Such cover audio 108 can be stored in a record specific to the relevant audio composition covered thereby, along with information indicative of the reproduction quality value determined in step S11. This provides users having access to the library with the possibility to specify a reproduction quality condition such that only cover audio recordings 108 complying with the reproduction quality condition can be included in a cover version of the audio composition. One such reproduction quality condition may set a reproduction quality threshold. Cover audio recordings with a reproduction quality value below this threshold cannot be included in a cover version of the audio composition and may not be visible or selectable due to the user imposed reproduction quality condition.

Continuing with the foregoing example in which the acoustic guitar contributions of a folk rock song are covered by a user, and bass guitar contributions are covered by their friend, it may be that only the user's acoustic guitar contributions are associated with a reproduction quality value above the threshold referred to in the previous paragraph. In this case only the user's cover audio, corresponding to their version of the acoustic guitar contributions, is selectable and able to be included in a cover version of the relevant folk song. The bass guitar contributions covered by their friend may not be included in such a cover version, and may not be selectable and/or viewable by a user in the library because the cover audio recording of the bass guitar contributions is associated with a reproduction quality value below the specified threshold.

In some embodiments the controller 202 causes information to be stored in the library, indicative of how often (or how many times) respective cover audio records 108 in the library are selected by users to be included in cover versions of audio compositions. The controller 202 may also store information in the library, indicative of which cover audio records 108, associated with respective audio compositions, are most recommended by different users. This provides users wishing to create cover versions of respective audio compositions (whether complete or partial) with greater flexibility to specify which cover audio recordings 108 they wish to hear in their resulting cover version. For instance, in the case of a folk song they may wish to create a cover version including the most highly recommended cover audio information associated with each respective instrument in the song. Alternatively they may wish to create a cover version of the song including cover audio information associated with one particular instrument, that cover audio information having the lowest reproduction quality value in the record associated with that song.

The foregoing teaching of libraries in the context of audio information is correspondingly applied to video information. For instance, video recordings of users performing various musical contributions to audio compositions may be stored in the library, and associated with the respective cover audio 108 to which they correspond.

Furthermore, the foregoing teaching of storing information indicative of how often (or how many times) user provided cover audio is utilised to create a cover version of an audio composition, is applicable to video information. For instance information can be stored in the library that is indicative of how often (or how many times) respective user provided videos are included in cover videos. This provides users wishing to create cover videos of respective audio compositions (whether complete or partial) with greater flexibility to specify which cover audio recordings 108 and associated videos they wish to include in their resulting cover version. For instance, in the case of a folk song they may wish to create a cover version including the cover audio associated with the most highly recommended user provided videos associated with each respective instrument in the song. Alternatively they may wish to create a cover version of the song including cover audio information associated with one particular instrument, that cover audio information being associated with the lowest rated user provided video in the record associated with that song.

Functionality may be provided to enable users to preview cover videos and/or cover audio recordings before deciding whether to include them in a cover version. This allows users the flexibility to select the most suitable user provided video and/or audio for their needs. For instance a user can select a user provided video which shows a close up of someone's hands performing something which the user would like to learn how to play.

Further possible variations of the heretofore described method will now be described.

Referring to FIGS. 4a to 4c, step S4 is only necessary when the original audio 106 is not accessible in multi-track format. Steps S11 to S14 only need to be performed if there is more than cover audio recording 108 corresponding to the same relevant track. Step 15 is optional.

The database mentioned in connection with step S2A need not be compiled using only MFCC values. For instance an alternative database could be compiled, and used in the same manner, which associates another property of recordings made using different instruments with respective instrument types. For example, each record in this database could contain information indicative of the chroma of audio previously made using the instrument corresponding to that record. Thus by comparing the chroma of one or more frames of cover audio 108 determined in step S2 with the database, the type of instrument used to produce the cover audio 108 can be determined by identifying the instrument type in said database which is associated with a similar chroma. Other example features include, but are not limited to, the spectral centroid, spectral kurtosis, spectral flatness, zero crossing rate, band energy ration, linear prediction coefficients (LPC), LPC cepstral coefficients, perceptual LPC, warped LPC, energies or powers on linearly spaced frequency bands, energies or powers on logarithmically spaced frequency bands, first or second order time derivatives of any of the mentioned features, transformations of any of the mentioned features such as linear discriminant analysis, principal component analysis, independent component analysis, nonlinear matrix factorization.

In step S2A, another way of determining which instrument was used to produce the cover audio 108 involves the controller 202 extracting information indicative thereof from additional data (e.g. metadata) stored in conjunction with the cover audio 108. Such additional data might, for example, have been sent to the analysis server 100 with the cover audio 108 from a user terminal 104.

When the heretofore described method arrives at step S6, if original audio 106 accessed by the controller 202 was already in multi-track format then step S4 will not have been implemented. In this case, identifying which tracks of original audio 106 were produced using the same instrument as the cover audio 108 can be performed in another manner. One way is for the controller 202 to extract from additional data (e.g. metadata), stored in conjunction with the multi-track original audio 106, information indicative thereof (i.e.

which instrument was used to produce the respective tracks). Alternatively, the additional data (e.g. metadata) may instead only be indicative of features of the respective tracks of original audio 106. In the present example this could include the MFCCs and chroma of separate frame in the respective tracks. In this case, for each respective track the MFCCs of one or more frames thereof, obtained from the additional data, can be compared with the aforementioned database to determine the type of instrument used to produce the original audio in that track. However, in some instances the cover audio 108 may be provided in multi-track format but said additional data (e.g. metadata) might not be available. In this case the techniques described in connection with step S2 may be used to determine the MFCCs and chroma of respective frames for each track of original audio 106 by applying such techniques to the respective tracks. MFCC values determined can then be compared with the aforementioned database to determine the instruments used to produce the audio in the respective tracks in the manner heretofore described.

In step S4 of the heretofore described method, another way in which the controller 202 can separate the original audio 106 into a plurality of tracks is to separate harmonic and drum parts of the original audio 106. This can be achieved by implementing the functionality described in a publication entitled "Separation of Drums From Polyphonic Music Using Non-Negative Matrix Factorization And Support Vector Machine", by Marko Helen and Tuomas Virtanen of the Institute of Signal Processing, Tampere University of Finland; reproduced in Proceedings of the European Signal Processing Conference EUSIPCO 2005. The contents of this publication, which are incorporated herein by reference, describe a suitable technique which can be applied in step S4 when the covered audio composition only contains drums and a single harmonic instrument.

Yet another way to substitute a portion of an original recording containing an instrument or singing is not to separate the original to a multitrack version, but instead make the original instrument quiet. Techniques to implement this include, for example, band stop filtering, comb filtering, any methods known in the art for removing vocals, or the like. Essentially, this involves substantially filtering (i.e. removing) audio corresponding to the identified track (or the part thereof covered by a user) and replacing the filtered audio (i.e. the removed audio) with the cover audio substantially in the same alignment in the temporal domain as the substantially filtered audio.

In step 11 of the heretofore described method, the reproduction quality value can alternatively be determined by comparing the main melody played in the cover audio 108 with the main melody played by the original artist in the relevant track, and then scored based on how closely it follows the original.

In some embodiments, alternatively or in addition to the heretofore described method of aligning cover audio 108 and a relevant track of original audio 106 in the temporal domain, the method presented in WO2013/064860, the contents of which are incorporated herein by reference, can be used for aligning cover audio 108 with a relevant track of original audio 106. This is a specific method for correlating two audio tracks, comprising using multi-level basis vector resolution technique. This method might, when used alone for alignment purposes, in some cases be faster or more reliable than the method already described. To record an instrument performance, a user can use digital recording software such as Cubase or Garage Band. The software can cause a speaker to generate a clicking sound, like a metronome, which helps the user to stay in time when recording a performance. Information indicative of the virtual metronome click times can be extracted from the software and used to help in the aligning of cover audio 108 (recorded using those click times) and a corresponding relevant track of original audio 108. Matching the click times to the beat times of the relevant track of original audio 106 gives a smaller set of possible alignments of the cover audio 108 and the relevant track. This of course requires preliminary knowledge of the beat times of the relevant track of original audio 106, which can be stored (for example as metadata) along with the multitrack audio files of original audio 106, or estimated using beat tracking algorithms, for instance as described in "Analysis of the Meter of Acoustic Musical Signals", Anssi P. Klapuri, Antti J. Eronen, and Jaakko T. Astola, Audio, Speech, and Language Processing, IEEE Transactions on 14 (1), 342-355; the contents of which are incorporated herein by reference.

It will be appreciated that any functionality required to be implemented by software at user terminals 104 can be implemented using a dedicated software application (hereafter "app"). Such an app can be downloaded over the internet, for example from the analysis server 100.

It will also be appreciated that the various components of the analysis server 100 need not be contained within a single server device. Various components of the heretofore described analysis server 100 may instead be located at a plurality of remote locations and can transmit data between one another via at least one networks e.g. a LAN, WAN or the internet. Another way of saying this is that in some embodiments some components of the analysis server 100 can be distributed across a network.

The method illustrated in FIGS. 4a to 4c was described as including the calculation of MFCCs however, in other embodiments the MFCCs may be complemented with their first and/or second order time derivatives.

Although embodiments of the invention have been described in the context of instrument recognition, on the basis of the information described herein persons skilled in the art could easily apply the functionality to recognising voices also (e.g. singer's contributions to audio compositions). In particular in some embodiments the controller 202 can determine whether the cover audio 108 corresponds to a voice. Also, one or more tracks of original audio 106 could be distinguished on the basis that they correspond with a "voice". In particular, in such embodiments the meaning of "instrument type" mentioned in this application can be extended to include "voice" among other instrument types such as "guitar", "drum", "violin" etc.

In some embodiments, when voice is included as an instrument the recognition may be performed in two steps: first recognizing whether the audio contains singing or is instrumental, and then in the case of instrumental classification recognizing the instrument. Classification between music which is instrumental and which contains vocals could be done, for example, using the method described in Maddage, N., Xu, C., and Wang, Y., A SVM-based classification approach to musical audio, in Proceedings of the 4th International Conference on Music Information Retrieval (ISMIR 2003).

In some embodiments the original audio 106 is one of music, a song, a tune, a podcast, or a jingle and the cover audio 108 is a recording of a cover of part thereof.

Reference is again made to the patent applications previously referred to in connection with step S2, WO2012/001216, and the UK patent application number 1310861.8.

For completeness of disclosure the relevant teaching of these documents will now be outlined.

In particular page 38, line 16 to page 39, line 34 of WO2012/001216 essentially discloses the following teaching (which is set out herein in the context of the present application).

Figure 5:
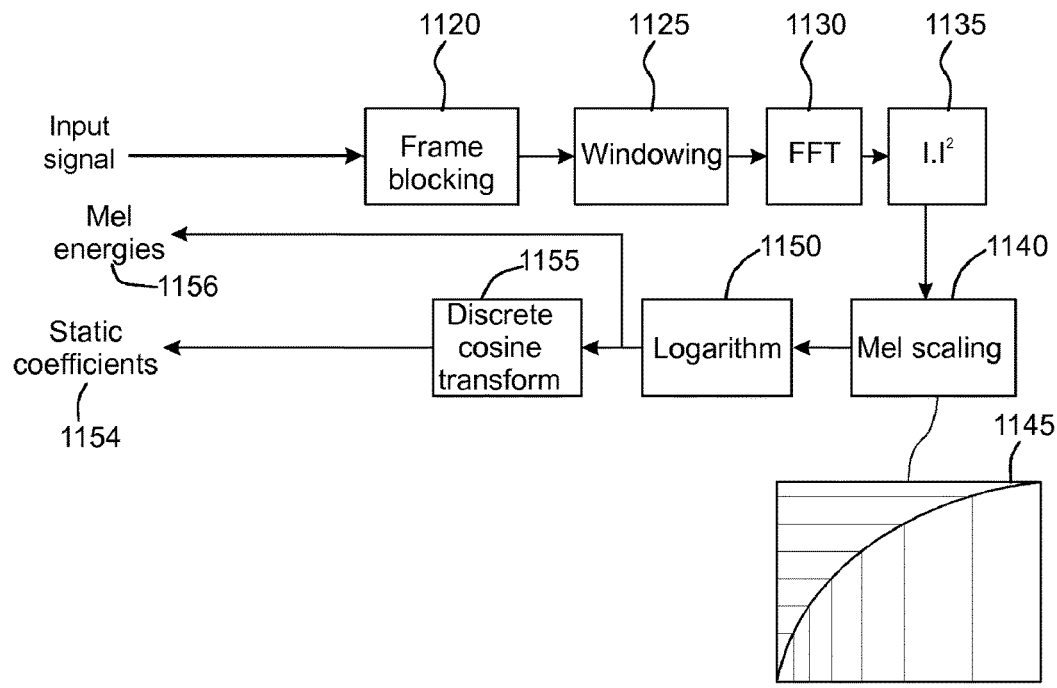
FIG. 5 shows a possible formation of a filter bank for the creation of mel-frequency cepstral coefficients.

FIG. 5 shows a method which can be implemented by the controller 202 to create mel-frequency cepstral coefficients (MFCCs) of audio, such that the MFCC thereof (for instance) can be determined. The controller 202 implements frame blocking 1120 and windowing 1125 on an input audio signal, e.g. in pulse code modulated form. In step 1120, frames are extracted from the signal by way of frame blocking. The blocks extracted may comprise e.g. 1024 or 2048 samples of audio, and the subsequent blocks may be overlapping or they may be adjacent to each other according to hop-size of for example 50% and 0%, respectively. The blocks may also be non-adjacent so that only part of the audio signal is formed into features. The blocks may be e.g. 30 ms long, 50 ms long, 100 ms long or shorter or longer. In step 1125, a windowing function such as the Hamming window or the Hann window is applied to the blocks to improve the behaviour of the subsequent transform.

In step 1130, a Fast Fourier Transform is applied to the windowed signal. In step 1135, the FFT magnitude is squared to obtain the power spectrum of the signal. The squaring may also be omitted, and the magnitude spectrum used instead of the power spectrum in the further calculations. This spectrum can then be scaled by sampling the individual dense frequency bins into larger bins each spanning a wider frequency range. This may be done e.g. by computing a spectral energy at each mel-frequency filterbank channel by summing the power spectrum bins belonging to that channel weighted by the mel-scale frequency response. The produced mel-filterbank energies may be denoted by $\tilde{m}_j$, $j=1, \ldots, N$, where N is the number of bandpass mel-filters. The frequency ranges created in step 1140 may be according to a so-called mel-frequency scaling shown by 1145, which resembles the properties of the human auditory system which has better frequency resolution at lower frequencies and lower frequency resolution at higher frequencies. The mel-frequency scaling may be done by setting the channel center frequencies equidistantly on the mel-frequency scale, given by the formula:

$$Mel(f) = 2595 \log_{10}\left(1 + \frac{f}{700}\right)$$

where f is the frequency in Hertz.

Figure 6:
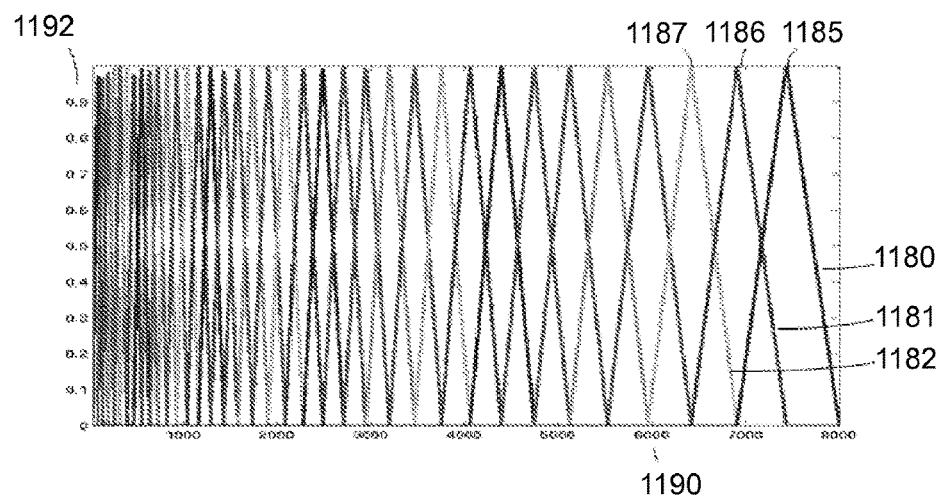
FIG. 6 shows an example mel-scaling filterbank.

An example mel-scale filterbank is given in FIG. 6. In FIG. 6, 36 triangular-shaped bandpass filters are depicted whose center frequencies 1185, 1186, 1187 and others not numbered may be evenly spaced on the perceptually motivated mel-frequency scale. The filters 1180, 1181, 1182 and others not numbered may span the frequencies 1190 from 30 hz to 22050 Hz, in the case of the input signal having a sampling rate of 44100 Hz. For the sake of example, the filter heights 1192 have been scaled to unity. Variations may be made in the mel-filterbank, such as spanning the band center frequencies linearly below 1000 Hz, scaling the filters such that they have unit area instead of unity height, varying the number of mel-frequency bands, or changing the range of frequencies the mel-filters span. In FIG. 5 in step 1150, a logarithm, e.g. a logarithm of base 10, may be taken from the mel-scaled filterbank energies $\tilde{m}_j$ producing the log filter-bank energies $m_j$, and then a Discrete Cosine Transform 1155 may be applied to the vector of log filterbank energies $m_j$ to obtain the MFCCs 1154 according to:

$$c_{mel}(i) = \sum_{j=1}^{N} m_j \cos\left(\frac{\pi \cdot i}{N}\left(j - \frac{1}{2}\right)\right)$$

where N is the number of mel-scale bandpass filters. $i=0, \ldots, I$ and I is the number of cepstral coefficients. In an exemplary embodiment I=13. It is also possible to obtain the mel energies 1156 from the output of the logarithm function. As a result, the audio features may be for example 13 mel-frequency cepstral coefficients per audio frame, 13 differentiated MFCCs per audio frame, 13 second degree differentiated MFCCs per audio frame, and an energy of the frame.

Furthermore, page 21, line 22 to page 22, line 7 of UK patent application number 1310861.8 discloses the following (which is set out herein in the context of the present application).

There are various ways to extract chroma features, including, for example, a straightforward summing of Fast Fourier Transform bin magnitudes to their corresponding pitch classes or using a constant-Q transform. In one method a multiple fundamental frequency ($F_0$) estimator can be used to calculate the chroma features of respective frames of audio. The $F_0$ estimation can be done, for example, as proposed in A. Klapuri, "Multiple fundamental frequency estimation by summing harmonic amplitudes," in Proc. 7th Int. Conf. Music Inf. Retrieval (ISMIR-06), Victoria, Canada, 2006; the contents of which are incorporated herein (i.e. into the present application) by reference.

The input to the method may be sampled at a 44.1-kHz sampling rate and have a 16-bit resolution. Framing may be applied on the input signal by dividing it into frames with a certain amount of overlap. In one implementation, 93-ms frames having 50% overlap can be used. The method first spectrally whitens the signal frame, and then estimates the strength or salience of each $F_0$ candidate. The $F_0$ candidate strength is calculated as a weighted sum of the amplitudes of its harmonic partials. The range of fundamental frequencies used for the estimation is 80-640 Hz. The output of the $F_0$ estimation step is, for each frame, a vector of strengths of fundamental frequency candidates. Here, the fundamental frequencies are represented on a linear frequency scale. To better suit music signal analysis, the fundamental frequency saliences are transformed on a musical frequency scale. In particular, a frequency scale having a resolution of $\frac{1}{3}^{rd}$-semitones, which corresponds to having 36 bins per octave can be used. For each ⅓rd of a semitone range, the controller 202 finds the fundamental frequency component with the maximum salience value and retains only that. To obtain a 36-dimensional chroma vector $x_b(k)$, where k is the frame index and $b=1, 2, \ldots, b_0$ is the pitch class index, with $b_0=36$, the octave equivalence classes are summed over the whole pitch range.

In some embodiments substituting at least part of an identified track with an audio recording, with substantially the same alignment in the temporal domain as said at least part of the identified track, may be done in an alternative manner.

For instance, this may involve mixing said at least part of the identified track with the audio recording (e.g. a cover audio recording). That is for at least part of an identified track and corresponding cover audio, the new audio samples produced (i.e. the resulting product audio) are a combination, such as a linear weighted sum, of audio samples comprising said at least part of the identified track and the cover audio respectively (said at least part of the identified track may remain slightly audible when the resulting product audio is played back). Such mixing can be done by multiplying audio samples of said at least part of the identified track with a gain alpha and the audio samples of the cover audio with the gain 1-alpha, where $0<=$alpha $<=1$, and then summing the gain-scaled audio samples of said at least part of the identified track and the cover audio. Alternatives for weighted linear combination could be, for example, unweighted linear combination or nonlinear combination or the like.

Lastly, it is noted that the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   storing a continuous audio composition having plural tracks at least partially overlapping with one another in the temporal domain and having a specific alignment in the temporal domain;
   obtaining time-varying audio characteristics of an audio recording, wherein the time-varying audio characteristics comprise mel-frequency cepstral coefficient information, and/or chroma information, of respective frames wherein each frame has a length in the temporal domain;
   identifying at least part of one of the plural tracks that corresponds to the audio recording;
   using the time-varying audio characteristics of the audio recording to align the audio recording with said at least part of the identified track; and
   substituting said at least part of the identified track with the audio recording with substantially the same alignment in the temporal domain as said at least part of the identified track.

2. The method of claim 1, further comprising:
   for plural different temporal alignments between the audio recording and the identified track, determining a degree of correlation between the time-varying audio characteristics of the audio recording and corresponding time-varying audio characteristics of the identified track;
   identifying a temporal alignment that provides a highest correlation; and
   substituting said at least part of the identified track with the audio recording using the identified temporal alignment.

3. The method of claim 1, further comprising:
   using the time varying audio characteristics of the audio recording to determine a type or class of instrument used to produce the audio recording; and
   identifying said one of the plural tracks, corresponding to the audio recording, by determining which track was produced using the same type or class of instrument.

4. The method of claim 1, comprising:
   substituting said at least part of the identified track with the audio recording, with substantially the same alignment in the temporal domain as said at least part of the identified track, only if a measure of correspondence between the identified track and the audio recording exceeds a quality threshold.

5. The method of claim 1, further comprising:
   determining a quality value indicative of the degree of correspondence between said at least part of the identified track and the audio recording; and
   refraining from substituting said at least part of the identified track with the audio recording if the quality value is less than a predetermined amount.

6. The method of claim 5, further comprising:
   using time varying audio characteristics of another audio recording to identify at least part of one of the plural tracks that corresponds to the other audio recording;
   if said previously identified at least part of the identified track is identified to be the at least part of the one of the plural tracks that corresponds to said other audio recording, then determining another quality value indicative of the degree of correspondence between said at least part of the identified track and the other audio recording; and
   substituting said at least part of the identified track with the audio recording associated with the highest quality value, provided it is not less than said predetermined amount.

7. The method of claim 1, further comprising:
   substantially aligning the substituted audio recording and a video associated therewith in the temporal domain.

8. The method of claim 7, further comprising:
   obtaining the audio recording and the video from a library if information associated with the video, also in the library, satisfies a predetermined condition, wherein said information is indicative of at least one of; the number of times the video has been selected from the library, how often the video is selected from the library, and a user rating of the video.

9. The method of claim 1, further comprising:
   obtaining the audio recording from a library if information associated therewith, also in the library, satisfies a predetermined condition, wherein said information is indicative of at least one of; the number of times the audio recording has been selected from the library, how often the audio recording is selected from the library, and a user rating of the audio recording.

10. The method of claim 1, wherein substituting said at least part of the identified track with the audio recording with substantially the same alignment in the temporal domain as said at least part of the identified track comprises:
    replacing said at least part of the identified track with the audio recording; or
    substantially silencing said at least part of the identified track and including a new track in the continuous audio composition, said new track containing the audio recording substantially in the same alignment in the temporal domain as said at least part of the identified track.

11. An apparatus comprising at least one processor and at least one memory including computer program code for one or more programs, the at least one memory and the computer program code configured to, with the at least one processor, cause the apparatus at least to:
    store a continuous audio composition having plural tracks at least partially overlapping with one another in the temporal domain and having a specific alignment in the temporal domain;
    obtain time-varying audio characteristics of an audio recording, wherein the time-varying audio characteristics comprise mel-frequency cepstral coefficient information, and/or chroma information, of respective frames wherein each frame has a length in the temporal domain;

identify at least part of one of the plural tracks that corresponds to the audio recording;

use the time-varying audio characteristics of the audio recording to align the audio recording with said at least part of the identified track; and substitute said at least part of the identified track with the audio recording with substantially the same alignment in the temporal domain as said at least part of the identified track.

12. The apparatus of claim 11, wherein the apparatus is further caused to:

for plural different temporal alignments between the audio recording and the identified track, determine a degree of correlation between the time-varying audio characteristics of the audio recording and corresponding time-varying audio characteristics of the identified track;

identify a temporal alignment that provides a highest correlation; and substitute said at least part of the identified track with the audio recording using the identified temporal alignment.

13. The apparatus of claim 11, wherein the apparatus is further caused to:

use the time varying audio characteristics of the audio recording to identify the one of the plural tracks that corresponds to the audio recording.

14. The apparatus of claim 11, wherein the apparatus is further caused to:

use the time varying audio characteristics of the audio recording to determine a type or class of instrument used to produce the audio recording; and identify said one of the plural tracks, corresponding to the audio recording, by determining which track was produced using the same type or class of instrument.

15. The apparatus of claim 11, wherein the apparatus is caused to:

substitute said at least part of the identified track with the audio recording, with substantially the same alignment in the temporal domain as said at least part of the identified track, only if a measure of correspondence between the identified track and the audio recording exceeds a quality threshold.

16. The apparatus of claim 11, wherein the apparatus is further caused to:

determine a quality value indicative of the degree of correspondence between said at least part of the identified track and the audio recording; and refrain from substituting said at least part of the identified track with the audio recording if the quality value is less than a predetermined amount.

17. The apparatus of claim 16, wherein the apparatus is caused to:

use time varying audio characteristics of another audio recording to identify at least part of one of the plural tracks that corresponds to the other audio recording;

if said previously identified at least part of the identified track is identified to be the at least part of the one of the plural tracks that corresponds to said other audio recording, then determine another quality value indicative of the degree of correspondence between said at least part of the identified track and the other audio recording; and substitute said at least part of the identified track with the audio recording associated with the highest quality value, provided it is not less than said predetermined amount.

18. The apparatus of claim 11, wherein the apparatus is further caused to:

substantially align the substituted audio recording and a video associated therewith in the temporal domain.

19. The apparatus of claim 18, wherein the apparatus is further caused to:

obtain the audio recording and the video from a library if information associated with the video, also in the library, satisfies a predetermined condition, wherein said information is indicative of at least one of; the number of times the video has been selected from the library, how often the video is selected from the library, and a user rating of the video.

20. The apparatus of claim 11, wherein the apparatus is further caused to:

obtain the audio recording from a library if information associated therewith, also in the library, satisfies a predetermined condition, wherein said information is indicative of at least one of; the number of times the audio recording has been selected from the library, how often the audio recording is selected from the library, and a user rating of the audio recording.

21. The apparatus of claim 11, wherein the apparatus caused to substitute said at least part of the identified track with the audio recording with substantially the same alignment in the temporal domain as said at least part of the identified track is caused to:

replace said at least part of the identified track with the audio recording; or substantially silence said at least part of the identified track and including a new track in the continuous audio composition, said new track containing the audio recording substantially in the same alignment in the temporal domain as said at least part of the identified track.

* * * * *